(12) United States Patent
Bao

(10) Patent No.: US 7,422,170 B2
(45) Date of Patent: Sep. 9, 2008

(54) LEAVES AND SEEDS HAND GRINDER

(76) Inventor: Fan Bao, 168 Mason Way, Unit B4, City of Industry, CA (US) 91746

( * ) Notice: Subject to any disclaimer, the term of this patent is extended or adjusted under 35 U.S.C. 154(b) by 64 days.

(21) Appl. No.: 11/704,629

(22) Filed: Feb. 9, 2007

(65) Prior Publication Data

US 2008/0191073 A1 Aug. 14, 2008

(51) Int. Cl.
*A47J 17/00* (2006.01)
*A47J 43/00* (2006.01)
(52) U.S. Cl. .................. 241/168; 241/169.1; 241/273.3
(58) Field of Classification Search .................. 241/168, 241/169, 169.1, 273.3
See application file for complete search history.

(56) References Cited

U.S. PATENT DOCUMENTS

| 795,746 | A | * | 7/1905 | Wingfield et al. ........... 206/238 |
| 2,022,151 | A | * | 11/1935 | Riddle ........................ 241/89.4 |
| 3,581,790 | A | * | 6/1971 | Conte ......................... 241/88.1 |
| 3,729,096 | A | * | 4/1973 | Fitzner et al. ................ 209/664 |
| 6,945,486 | B2 | * | 9/2005 | Teng ........................ 241/169.1 |
| 7,147,174 | B2 | * | 12/2006 | Mansen ........................ 241/30 |
| 7,367,519 | B2 | * | 5/2008 | de Groote et al. ......... 241/169.1 |

* cited by examiner

*Primary Examiner*—Bena Miller
(74) *Attorney, Agent, or Firm*—Raymond Y. Chan; David and Raymond Patent Firm

(57) ABSTRACT

A grinder includes a grinder housing having a grinder actuator, a first grinding plate, a second grinding plate and a detachable coupling arrangement. The first grinding plate is detachably coupling with the grinder actuator, wherein the first grinding plate has a plurality of first grinding knifes downwardly and spacedly extended from a bottom side of the first grinding plate. The second grinding plate has a plurality of second grinding knifes upwardly and spacedly extended from the top side of the second grinding plate at a position that the first and second grinding knifes are spacedly disposed within a grinding compartment, such that when the grinder actuator is turned with respect to the grinder base to drive the first grinding plate to rotate, the first and second grinding knifes are correspondingly moved within the grinding compartment to provide a grinding action.

20 Claims, 4 Drawing Sheets

LEAVES AND SEEDS HAND GRINDER

BACKGROUND OF THE PRESENT INVENTION

1. Field of Invention

The present invention relates to a grinder, and more particularly to a grinder wherein a first grinding plate is capable of being detached from a second grinding plate so as to minimize the manufacturing cost and ease of operation of the present invention.

2. Description of Related Arts

A conventional grinder usually comprises a first grinding unit and a second grinding unit operatively coupled with the first grinding unit to form a grinding cavity within the grinder for grinding a predetermined amount of objects, such as leaves, tobacco, and the likes.

More specifically, the first grinding unit comprises a first grinder housing, and a first grinder knife integrally mounted on the first grinder housing, whereas the second grinding unit comprises a second grinder housing, and a second grinder knife integrally mounted on the second grinder housing for coupling with the first grinding unit. The first grinder knife comprises a first supporting member and a plurality of first knife blades extended from the first supporting member, while the second grinder knife comprises a second supporting member and a plurality of second knife blades extended from the second supporting member towards the first supporting member for forming the grinder cavity between the first supporting member and the second supporting member. In order to grind leaves, for example, a user of the conventional grinder needs to put a predetermined amount of leaves into the grinding cavity, wherein the first and the second grinder knifes are driven to rotate in opposite directions respectively for cutting the finely leaves within the grinder cavity by the first and the second knife blades. As such, the leaves disposed within the grinder cavity are then grinded into tiny small pieces or even into powdered form for further use by the user. Very often, the conventional grinder may further comprise a collection arrangement coupled with the second grinder unit whereas the second supporting member further has a plurality of through collection slots formed thereon for allowing the grinded objects to drop into the object collection arrangement through the collection slots.

These are several disadvantages in association with this conventional grinder. First, for almost all conventional grinders, each of the first and the second grinding unit is usually an integral structure manufactured from a predetermined kind of materials, such as metallic materials. As a result, the first/second grinder housing is integrally connected with the corresponding grinder knife. Thus, one has to manufacture the grinder housing, the supporting member and the corresponding grinder knife in a one-piece manner. The problem, however, is that it is difficult and rather expensive to manufacture the grinder housing, the supporting member and the grinder knife as an integral one-piece structure. It utilizes the complicated CNC machine procedures. The procedure is time-consuming and also wastes large amount of material.

The second disadvantage is in relation to the one disadvantage. Since the first and the second grinding unit is manufactured as a one-piece integral structure, and that the first and the second grinding unit usually made of metallic materials, these make electroplating of the first and the second grinding unit inconvenient and effectively curtailing the possibility of having sophisticated aesthetic appearance on the part of the grinding unit: it is far more easier to electroplate separate components with different colors or aesthetic appearance than making the same aesthetic patterns in one integral one-piece structure. Since the majority of grinders are not expected to be high-end products, manufacturers simply cannot spend much money for adopting highly complicated manufacturing procedures. Moreover, since the grinder housing, the supporting member, and the grinder knife are made from the same predetermined material, conventional grinders substantially limited their use. For example, grinders made from a particular material may only be used for grinding a certain kinds of objects, and may not be utilized for grinding a wider selection of other objects. As a result, the circumstances in which conventional grinders can be used strictly depend on which materials are utilized for manufacturing them.

SUMMARY OF THE PRESENT INVENTION

A main object of the present invention is to provide a grinder wherein a first grinding plate is capable of being detached from a second grinding plate so as to minimize the manufacturing cost and ease of operation of the present invention.

Another object of the present invention is to provide a grinder comprising a detachable coupling arrangement for facilitating effective operation of the grinder while allowing effective detachment of the first grinding plate from the second grinding plate.

Another object of the present invention is to provide a grinder wherein the first grinding plate is detachable from the second grinding plate so as to allow the present invention to be easily and economically manufactured, and easily decorated with a wide range of desirable aesthetic patterns.

Another object of the present invention is to provide a grinder which is can be adapted to grind a wide variety of objects by using different types of grinding knifes so as to overcome the conventional problem that conventional grinders have a rather narrow range of applications.

Accordingly, in order to accomplish the above objects, the present invention provides a grinder, comprising:

a grinder housing comprising a grinder base and a grinder actuator detachably coupling with the grinder base, and forming a grinding compartment therebetween;

a first grinding plate detachably coupling with the grinder actuator, wherein the first grinding plate has a plurality of first grinding knifes downwardly and spacedly extended from a bottom side of the first grinding plate;

a second grinding plate detachably coupling with the grinder base to define the grinding compartment between a top side of the second grinding plate and the bottom side of the first grinding plate, wherein the second grinding plate has a plurality of second grinding knifes upwardly and spacedly extended from the top side of the second grinding plate at a position that the first and second grinding knifes are spacedly disposed within the grinding compartment, such that when the grinder actuator is turned with respect to the grinder base to drive the first grinding plate to rotate, the first and second grinding knifes are correspondingly moved within the grinding compartment to provide a grinding action; and a detachable coupling arrangement comprising a first magnetic element affixing to the first grinding plate, and a second magnetic element which is affixed to the second grinding plate to align with the first magnetic element, wherein the first magnetic element is magnetically attached to the second magnetic element to detachably couple the first grinding plate with the second grinding plate so as to allow the first and second grinding plates detaching with each other and from the grinder housing.

These and other objectives, features, and advantages of the present invention will become apparent from the following detailed description, the accompanying drawings, and the appended claims.

DETAILED DESCRIPTION OF THE PREFERRED EMBODIMENT

Figure 1:
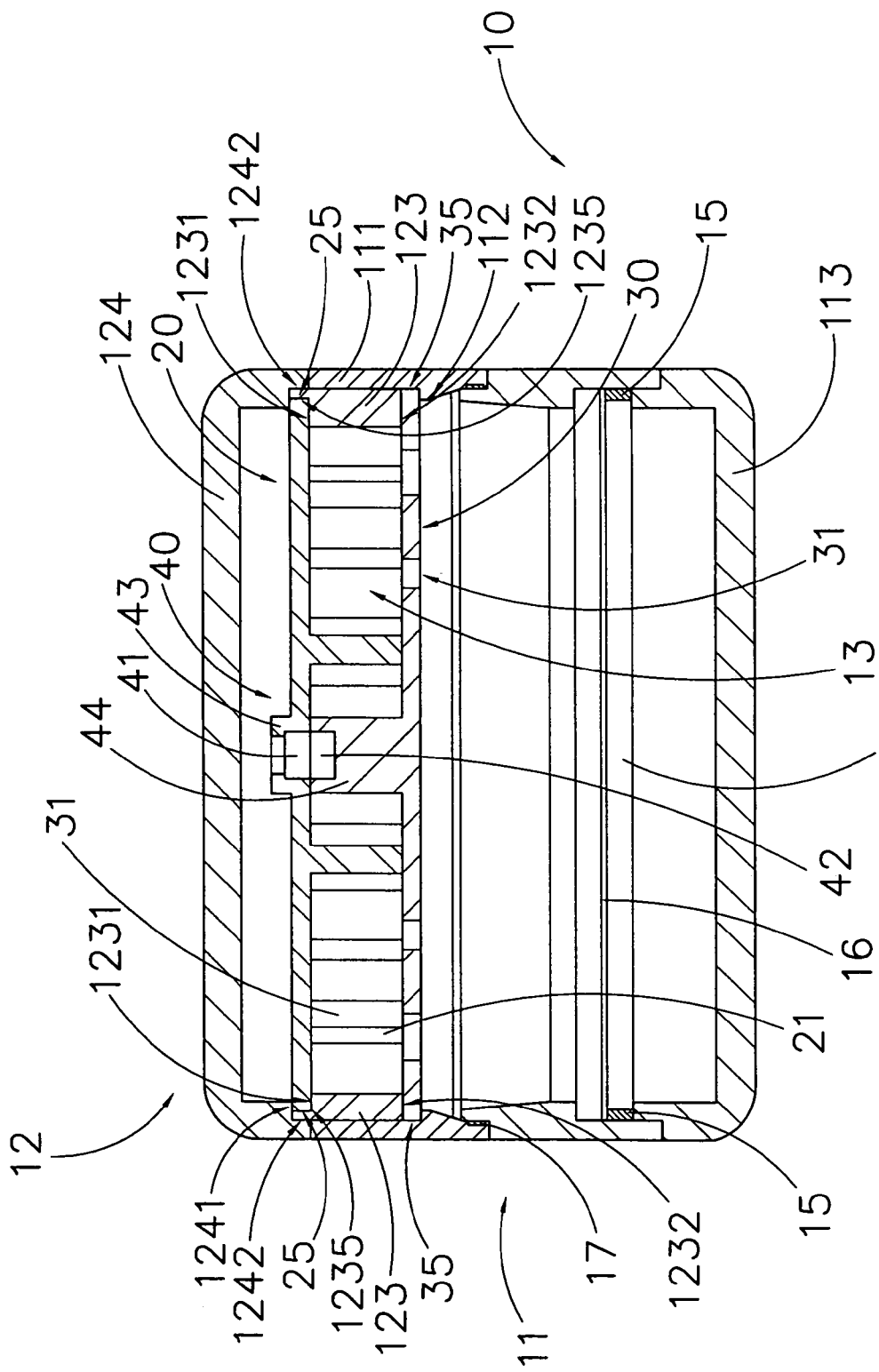
FIG. 1 is a sectional side view of a grinder according to a preferred embodiment of the present invention.
Figure 2:
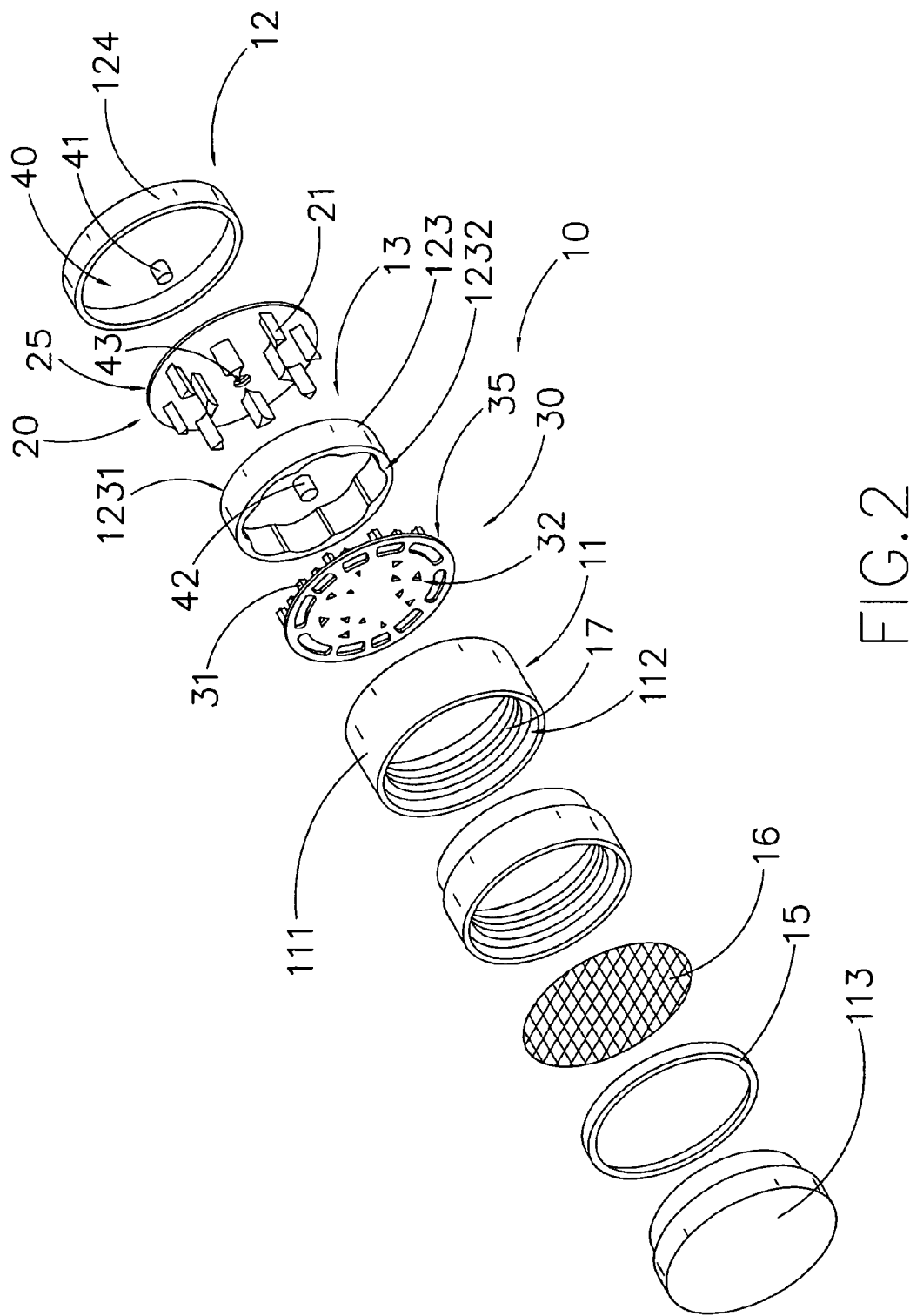
FIG. 2 is an exploded perspective view of the grinder according to the above preferred embodiment of the present invention.

Referring to FIG. 1 to FIG. 2 of the drawings, a grinder for a predetermined amount and range of objects, such as a predetermined amount of leaves or tobacco, according to a preferred embodiment of the present invention is illustrated, in which the grinder comprises a grinder housing 10, a first grinding plate 20, a second grinding plate 30, and a detachable coupling arrangement 40.

The grinder housing 10 comprises a grinder base 11 and a grinder actuator 12 detachably coupling with the grinder base 11, and forming a grinding compartment 13 therebetween.

The first grinding plate 20 is detachably coupling with the grinder actuator 12, wherein the first grinding plate 20 has a plurality of first grinding knifes 21 downwardly and spacedly extended from a bottom side of the first grinding plate 20.

The second grinding plate 30 is detachably coupling with the grinder base 11 to define the grinding compartment 13 between a top side of the second grinding plate 30 and the bottom side of the first grinding plate 20, wherein the second grinding plate 30 has a plurality of second grinding knifes 31 upwardly and spacedly extended from the top side of the second grinding plate 30 at a position that the first and second grinding knifes 21, 31 are spacedly disposed within the grinding compartment 13, such that when the grinder actuator 12 is turned with respect to the grinder base 11 to drive the first grinding plate 20 to rotate, the first and the second grinding knifes 21, 31 are correspondingly moved within the grinding compartment 13 to provide a grinding action for grinding the objects within the grinding compartment 13.

The detachable coupling arrangement 40 comprises a first magnetic element 41 affixing to the first grinding plate 20, and a second magnetic element 42 which is affixed to the second grinding plate 30 to align with the first magnetic element 41, wherein the first magnetic element 41 is magnetically attached to the second magnetic element 42 to detachably and rotatably couple the first grinding plate 20 with the second grinding plate 30 so as to allow the first and second grinding plates 20, 30 detaching with each other and from the grinder housing 10 and rotating with each other to correspondingly move the first and second grinding knifes 21, 22 within the grinding compartment 13.

The grinder actuator 12 comprises a ring shaped transmission member 123 rotatably disposed in the grinding compartment 13 at a position that an upper circumferential edge 1231 of the transmission member 123 is engaged with a peripheral edge 25 of the first grinding plate 20 and a lower circumferential edge 1232 of the transmission member 123 is biased against a peripheral edge 35 of the second grinding plate 30, and a top actuation cap 124, which is detachably engaged with the grinder base 11 in a rotatably movable manner, having a peripheral rim 1241 coupled with the upper circumferential edge 1231 of the transmission member 123 such that when the top actuation cap 1233 is rotated, the first grinding plate 20 is driven to rotate through the transmission member 123 so as to correspondingly move the first and second grinding knifes 21, 22 within the grinding compartment 13.

The upper circumferential edge 1231 of the transmission member 123, having a L-shaped cross section, has an inner engaging groove 1235 engaging with the peripheral edge 25 of the first grinding plate 20 so as to embed the first grinding plate 20 at the upper circumferential edge 1231 of the transmission member 123, such that the transmission member 123 not only transmits a rotational force from the top actuation cap 124 to the first grinding plate 20 but also retains the first and second grinding plates 20, 30 at an uniform distance.

Accordingly, the peripheral rim 1241 of the top actuation cap 124 has a L-shaped cross section and forming an inner holding groove 1242 to engage with the upper circumferential edge 1231 of the transmission member 123 and the peripheral edge 25 of the first grinding plate 20.

The grinder base 11 comprises a tubular shelter 111, which is detachably engaged with the top actuation cap 124, having an engaging rib 112 protruding from an inner wall of the tubular shelter 111 to engage with the peripheral edge 25 of the second grinding plate 30 so as to retain the second grinding plate 30 in position. Moreover, the grinder base 11 further comprises a bottom actuation cap 113 detachably engaging with the tubular shelter 111 and arranged in such a manner that when the top and bottom actuation caps 124, 113 are rotated back and forth correspondingly, the first and second grinding knifes 21, 31 are moved rotated back and forth correspondingly in a grinding manner.

In order to securely retain the grinded objects, the grinder base 11 further comprises a filtering holder 15 detachably mounting between the bottom actuation cap 113 and the tubular shelter 111 and a filtering layer 16 mounted within the filtering holder 15 for filtering the grinded objects being dropped from the collecting holes 31 and collected at the bottom actuation cap 113.

It is worth mentioning that since the first grinding plate 20 is detachably mounted from the grinder actuator 12, the first grinding plate 20 is easy to manufacture by conventional manufacturing process and technology. Moreover, by attaching different first grinding plates 20, the grinder of the present invention is adapted to grind a wider category of objects than what could be achieved by conventional grinders. Having said that, the material for the first grinding plate 20 is preferably aluminum.

The second grinding plate 30 has a plurality of collecting holes 32 spacedly formed thereon to communicate the grinding compartment 13 with an interior of the bottom actuation cap 113 such that when the first and second grinding units are driven for grinding objects within the grinding compartment 13, the grinded objects are dropped and collected at the bottom actuation cap 113 through the collecting holes 32.

On the other hand, the detachable coupling arrangement 40 further comprises a first magnetic housing 43 provided at a center of the first grinding plate 20 to retain the first magnetic element 41 in position, and a second magnetic housing 44 protruded from a center of the second grinding plate 30 to retain the second magnetic element 42 in position so as to alignedly guide the second magnetic element 42 to magnetically attach to the first magnetic element 41.

Figure 3:
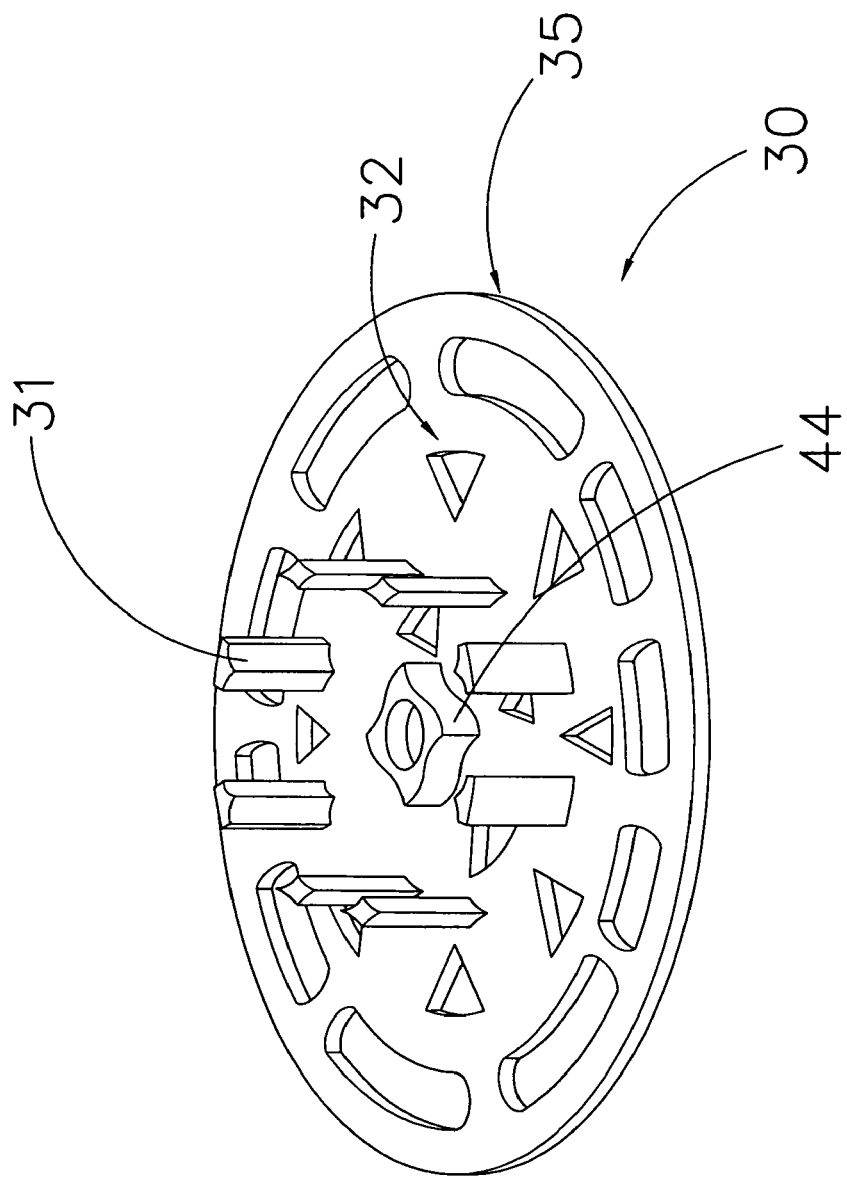
FIG. 3 is a schematic diagrams of the second grinding plates according to the above preferred embodiment of the present invention.
Figure 4:
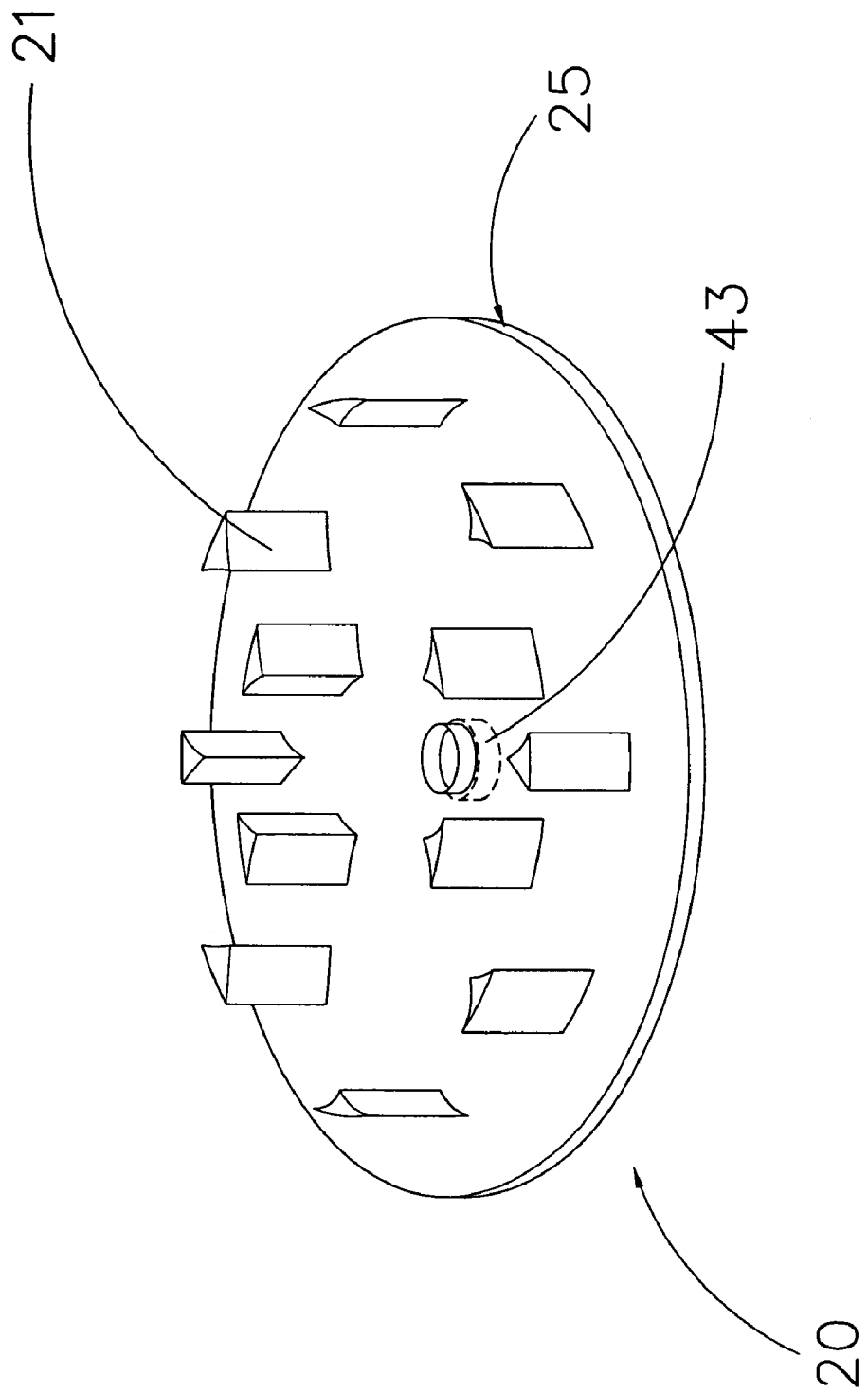
FIG. 4 is a schematic diagram of the first grinding plate according to the above preferred embodiment of the present invention.

Referring to FIG. 3 and FIG. 4 of the drawings, according to the preferred embodiment of the present invention, the first and second grinding knifes 21, 31 are perpendicularly extended from the first and second grinding plates 20, 30 respectively. Moreover, the first and second grinding plates 20, 30 are supported in a parallel manner that the first grinding knifes 21 are offset from the second grinding knifes 31 within the grinding compartment 13 such that a circular moving path of each of the first grinding knifes 21 is different from that of each of the second grinding knifes 31. Thus, when the grinder is grinding objects within the grinding compartment 13, the first and the second grinding knife 21, 31 will not collide among themselves and with each other.

According to the preferred embodiment of the present invention, the grinder housing 10 may further comprise a sealing ring 17 disposed between the first and the second grinding plates 20, 30 at a peripheral rim thereof in such a manner that when the first and the second grinding plates 20, 30 are driven to rotate, the sealing ring 17 is adapted to facilitate smooth rotational movement of them.

The operation of the present invention is as follows: a user has to detach the first grinding plate 20 from the second grinding plate 30 in order to dispose a predetermined amount of objects, such as leaves, into the grinding compartment 13. After that, the user has to rotatably attach the first grinding plate 20 to the second grinding plate 30 as retained by the detachably coupling arrangement 40. A preferred mode of operation is that the user put the grinder upside down, and then starts grinding the leaves by rotating the first grinding plate 20 and the second grinding plate 30 in an opposite direction for driving the first and the second grinding knifes 21, 31 to finely grind the objects within the grinding compartment 13. After the leaves have been grinded in the grinding compartment 13, the user has to restore the position of the grinder so as to allow the grinded leaves to fall into the filtering layer 16 through the collecting holes 32 formed on the second grinding plate 30 so that the grinded objects are collected in the bottom actuation cap 113.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A grinder, comprising:
a grinder housing comprising a grinder base and a grinder actuator detachably coupling with said grinder base, and forming a grinding compartment therebetween;
a first grinding unit detachably coupling with said grinder actuator, wherein said first grinding unit comprises a first grinding plate and a plurality of first grinding knifes downwardly and spacedly extended from a bottom side of said first grinding plate;
a second grinding unit detachably coupling with said grinder base, wherein said second grinding unit comprises a second grinding plate and a plurality of second grinding knifes upwardly and spacedly extended from said top side of said second grinding plate, wherein said grinding compartment is formed between said first and second grinding plates that said first and second grinding knifes are spacedly disposed within said grinding compartment, such that when said grinder actuator is turned with respect to said grinder base to drive said first grinding plate to rotate, said first and second grinding knifes are correspondingly moved within said grinding compartment to provide a grinding action; and
a detachable coupling arrangement comprising a first magnetic element affixing to said first grinding plate, and a second magnetic element which is affixed to said second grinding plate to align with said first magnetic element, wherein said first magnetic element is magnetically attached to said second magnetic element to detachably couple said first grinding plate with said second grinding plate so as to allow said first and second grinding plates detaching with each other and rotating with each other to correspondingly move said first and second grinding knifes within said grinding compartment.

2. The grinder, as recited in claim 1, wherein said grinder actuator comprises a ring shaped transmission member rotatably disposed in said grinding compartment at a position that an upper circumferential edge of said transmission member is engaged with a peripheral edge of said first grinding plate and a lower circumferential edge of said transmission member is biased against a peripheral edge of said second grinding plate, and a top actuation cap, which is detachably engaged with said grinder base in a rotatably movable manner having a peripheral rim coupled with said upper circumferential edge of said transmission member such that when said top actuation cap is rotated, said first grinding plate is driven to rotate through said transmission member so as to correspondingly move said first and second grinding knifes within said grinding compartment.

3. The grinder, as recited in claim 2, wherein said upper circumferential edge of said transmission member, having a L-shaped cross section, has an inner engaging groove engaging with said peripheral edge of said first grinding plate so as to embed said first grinding plate at said upper circumferential edge of said transmission member, such that said transmission member not only transmits a rotational force from said top actuation cap to said first grinding plate but also retains said first and second grinding plates at an uniform distance.

4. The grinder, as recited in claim 3, wherein said peripheral rim of said top actuation cap having a L-shaped cross section and forming an inner holding groove to engage with said upper circumferential edge of said transmission member and said peripheral edge of said first grinding plate.

5. The grinder, as recited in claim 2, wherein said grinder base comprises a tubular shelter, which is detachably engaged with said top actuation cap, having an engaging rib protruding from an inner wall of said tubular shelter to engage with said peripheral edge of said second grinding plate so as to retain said second grinding plate in position.

6. The grinder, as recited in claim 4, wherein said grinder base comprises a tubular shelter, which is detachably engaged with said top actuation cap, having an engaging rib protruding from an inner wall of said tubular shelter to engage with said peripheral edge of said second grinding plate so as to retain said second grinding plate in position.

7. The grinder, as recited in claim 5, wherein said grinder base further comprises a bottom actuation cap detachably engaging with said tubular shelter and arranged in such a manner that when said top and bottom actuation caps are rotated back and forth correspondingly, said first and second grinding knifes are moved rotated back and forth correspondingly in a grinding manner.

8. The grinder, as recited in claim 6, wherein said grinder base further comprises a bottom actuation cap detachably engaging with said tubular shelter and arranged in such a manner that when said top and bottom actuation caps are rotated back and forth correspondingly, said first and second grinding knifes are moved rotated back and forth correspondingly in a grinding manner.

9. The grinder, as recited in claim 7, wherein said second grinding plate has a plurality of collecting holes spacedly formed thereon to communicate said grinding compartment with an interior of said bottom actuation cap such that when said first and second grinding units are driven for grinding objects within said grinding compartment, said grinded objects are dropped and collected at said bottom actuation cap through said collecting holes.

10. The grinder, as recited in claim 8, wherein said second grinding plate has a plurality of collecting holes spacedly formed thereon to communicate said grinding compartment with an interior of said bottom actuation cap such that when said first and second grinding units are driven for grinding objects within said grinding compartment, said grinded objects are dropped and collected at said bottom actuation cap through said collecting holes.

11. The grinder, as recited in claim 9, wherein said aid grinder base further comprises a filtering holder detachably mounting between said bottom actuation cap and said tubular shelter and a filtering layer mounted within said filtering holder for filtering said grinded objects being dropped from said collecting holes and collected at said bottom actuation cap.

12. The grinder, as recited in claim 10, wherein said aid grinder base further comprises a filtering holder detachably mounting between said bottom actuation cap and said tubular shelter and a filtering layer mounted within said filtering holder for filtering said grinded objects being dropped from said collecting holes and collected at said bottom actuation cap.

13. The grinder, as recited in claim 1, wherein detachable coupling arrangement further comprises a first magnetic housing provided at a center of said first grinding plate to retain said first magnetic element in position, and a second magnetic housing protruded from a center of said second grinding plate to retain said second magnetic element in position so as to alignedly guide said second magnetic element to magnetically attach to said first magnetic element.

14. The grinder, as recited in claim 6, wherein detachable coupling arrangement further comprises a first magnetic housing provided at a center of said first grinding plate to retain said first magnetic element in position, and a second magnetic housing protruded from a center of said second grinding plate to retain said second magnetic element in position so as to alignedly guide said second magnetic element to magnetically attach to said first magnetic element.

15. The grinder, as recited in claim 12, wherein detachable coupling arrangement further comprises a first magnetic housing provided at a center of said first grinding plate to retain said first magnetic element in position, and a second magnetic housing protruded from a center of said second grinding plate to retain said second magnetic element in position so as to alignedly guide said second magnetic element to magnetically attach to said first magnetic element.

16. The grinder, as recited in claim 1, wherein said first and second grinding knifes are perpendicularly extended from said first and second grinding plates respectively.

17. The grinder, as recited in claim 15, wherein said first and second grinding knifes are perpendicularly extended from said first and second grinding plates respectively.

18. The grinder, as recited in claim 1, wherein said first and second grinding plates are supported in a parallel manner that said first grinding knifes are offset from said second grinding knifes within said grinding compartment such that a circular moving path of each of said first grinding knifes is different from that of each of said second grinding knifes.

19. The grinder, as recited in claim 6, wherein said first and second grinding plates are supported in a parallel manner that said first grinding knifes are offset from said second grinding knifes within said grinding compartment such that a circular moving path of each of said first grinding knifes is different from that of each of said second grinding knifes.

20. The grinder, as recited in claim 17, wherein said first and second grinding plates are supported in a parallel manner that said first grinding knifes are offset from said second grinding knifes within said grinding compartment such that a circular moving path of each of said first grinding knifes is different from that of each of said second grinding knifes.

* * * * *